US006433971B1

(12) United States Patent
Sato et al.

(10) Patent No.: US 6,433,971 B1
(45) Date of Patent: Aug. 13, 2002

(54) THIN FILM MAGNETIC HEAD ADAPTABLE TO GAP NARROWING AND SUBSTRATE FOR FORMING THE SAME

(75) Inventors: Kiyoshi Sato; Katsuya Sugai, both of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/567,192

(22) Filed: May 9, 2000

(30) Foreign Application Priority Data

May 10, 1999 (JP) .......................................... 11-128544

(51) Int. Cl.$^7$ .............................................. G11B 5/127
(52) U.S. Cl. ...................................................... 360/322
(58) Field of Search ................................ 360/322, 313; 29/603.1, 603.15, 603.16

(56) References Cited

U.S. PATENT DOCUMENTS 5,588,199 A    12/1996 Krounbi et al.

*Primary Examiner*—Allen Cao
(74) *Attorney, Agent, or Firm*—Brinks Hofer Gilson & Lione

(57) ABSTRACT

A monitor element includes electrode layers each having a front end region and a back end region extended from the front end region in the track width direction. Therefore, the width dimension of the front end region in the ABS can be set to a smaller value than conventional elements, and the height controlling process can be performed while appropriately measuring the DC resistance value of the monitor element. A magnetoresistive element also includes electrode layers having the same shape, thereby suppressing the occurrence of smearing in a thin film magnetic head, and permitting manufacture with high yield.

11 Claims, 6 Drawing Sheets

THIN FILM MAGNETIC HEAD ADAPTABLE TO GAP NARROWING AND SUBSTRATE FOR FORMING THE SAME

BACKGROUND OF THE INVENTION

1. Field of the Invention

The present invention relates to a thin film magnetic head comprising a magnetoresistive element exhibiting magnetoresistance, and a substrate comprising a monitor element used in a step before the thin film magnetic head is manufactured. Particularly, the present invention relates to a thin film magnetic head which can decrease the occurrence of smearing in order to comply with the demand for gap narrowing accompanying an increase in recording density in future, and a substrate for forming the thin film magnetic head thereon.

2. Description of the Related Art

FIG. 5 is a partial plan view of a substrate on which a conventional thin film magnetic head is formed, and FIG. 6 is a sectional view taken along line VI—VI in FIG. 5. In FIG. 5, an upper gap layer 11 and an upper shielding layer 12 are not shown.

As shown in FIG. 6, a lower shielding layer 3 made of a magnetic material such as a NiFe alloy or the like is formed on a substrate 1 comprising, for example, $Al_2O_3$—TiC (alumina-titanium carbide), and a lower gap layer 4 made of an insulating material such as $Al_2O_3$ or the like is further formed on the lower shielding layer 3.

Referring to FIG. 6, a plurality of magnetoresistive elements 13 and a monitor element 5 are formed in a line in the ABS direction (the X direction shown in the drawing) on the lower gap layer 4.

Furthermore, a multilayer film 7 comprising, for example, an antiferromagnetic layer, a pinned magnetic layer, a nonmagnetic conductive layer, and a spin-valve film (a GMR element) comprising a free magnetic layer is formed at the center of each of the magnetoresistive elements 13. The spin-valve film serves as an element which utilizes magnetoresistance so that the electric resistance changes with a change in a leakage magnetic field from a recording medium to detect a recording signal. As shown in FIG. 6, electrode layers 8 made of a nonmagnetic metal material such as Cr (chromium) or the like are formed on both sides of the multilayer film 7.

The monitor element 5 also has the same structure as the magnetoresistive elements 13. Namely, a multilayer film 9 exhibiting magnetoresistance is formed at the center of the monitor element 5, and electrode layers 10 made of Cr (chromium) or the like are formed on both sides of the multilayer film 9. The magnetoresistive elements 13 and the monitor element 5 are simultaneously formed in a pattern on the lower gap layer 4.

As shown in FIG. 5, a pair of the electrode layers 8 constituting each of the magnetoresistive element 13, and a pair of the electrode layers 10 constituting the monitor element 5 are formed symmetrically on both sides of the multilayer films 7 and 9, respectively. The electrode layers 8 and 10 are exposed from the ABS.

As shown in FIG. 5, in the electrode layers 8 or 10 formed on both sides of each of the multilayer film 7 or 9 exposed from the ABS, the width dimension from one of the electrodes layers 8 or 10 to the other is T1. For example, the width dimension T1 is conventionally 80 μm or more.

As shown in FIG. 6, an upper gap layer 11 made of an insulating material such as $Al_2O_3$ or the like is formed on the magnetoresistive elements 13 and the monitor element 5, and an upper shielding layer 12 made of a NiFe alloy (permalloy) or the like is further formed on the upper gap layer 11.

The length dimension from the lower gap layer 4 to the upper gap layer 11 is defined as a magnetic gap G1.

The monitor element 5 serves as a processing monitor provided for setting the DC resistance (DCR) of each of the plurality of magnetoresistive elements 13, which are formed in the same line as the monitor element 5, to a predetermined value. After the monitor element 5 plays the role as the processing monitor, the monitor element is removed.

In order to set the DC resistance (DCR) of each of the magnetoresistive elements 13 to the predetermined value, the ABS-side surfaces (refer to FIG. 5) of the magnetoresistive elements 13 and the monitor element 5 are ground (height controlling) while measuring the DC resistance between the electrode layers 10 constituting the monitor element 5. Once a predetermined DC resistance value is obtained, grinding of the ABS side is finished.

Since the plurality of magnetoresistive elements 13 have the same structure and are formed in a line parallel to the ABS, as described above, when the DC resistance of the monitor element 5 reaches a predetermined value by grinding, the DC resistance value of each of the magnetoresistive elements 13 also reaches the predetermined value.

However, the gap is narrowed accompanying an increase in the recording density, and thus in grinding the ABS-side surfaces of the magnetoresistive elements 13 and the monitor element 5 while measuring the DC resistance between the electrode layers 10 constituting the monitor element 5, smearing occurs between the shielding layers 3 and 12 and the electrode layers 10 of the monitor element 5, which are exposed from the ABS, to cause a problem in which the electrode layers 10 are electrically connected to the shielding layers 3 and 12. Therefore, the DC resistance (DCR) between the electrode layers 10 of the monitor element 5 cannot be precisely measured, and thus the length dimension of the magnetoresistive elements 13 in the height direction (the Y direction shown in the drawing) cannot be set to a value with which the predetermined resistance value is obtained.

The smearing also occurs between the electrode layers 8 of each of the magnetoresistive elements 13 and the shielding layers 3 and 12.

Since the portion of the substrate where the magnetoresistive elements 13 are formed is used for products as thin film magnetic heads after the DC resistance of each of the magnetoresistive elements 13 is set to the predetermined value, the work of removing smearing between the electrode layers 8 and the shielding layers 3 and 12 in each magnetoresistive element 3 must be carried out before products of thin film magnetic heads are manufactured.

However, with an excessively narrow gap, it is very difficult to appropriately remove smearing which occurs in narrow magnetic gap G1, thereby causing the problem of deteriorating the yield of thin film magnetic heads.

Particularly, a conventional element has a structure in which each of the electrode layer pairs 8 and 10 exposed from the ABS have a large width dimension T1, and thus smearing readily occurs in the electrode layers 8 and 10 in controlling the height as the gap is increasingly narrowed.

SUMMARY OF THE INVENTION

The present invention has been achieved for solving the above problems, and it is an object of the present invention to provide a thin film magnetic head in which the shape of electrode layers is improved for decreasing smearing between the electrode layers and shielding layers in controlling the height, thereby making adaptable to gap narrowing, and provide a substrate for forming the magnetic head thereon.

The present invention provides a thin film magnetic head comprising a lower shielding layer, a magnetoresistive element formed on the lower shielding layer with a lower gap layer provided therebetween and comprising a multilayer film exhibiting magnetoresistance, a pair of bias layers formed on both sides of the multilayer film, for applying a bias magnetic field to the multilayer film, and a pair of electrode layers formed on the bias layers to conduct to the multilayer film, and an upper shielding layer formed on the magnetoresistive element with an upper gap layer provided therebetween, wherein each of the electrode layers and the bias layers comprises a front end region with a predetermined length dimension from the ABS in the height direction, and a back end region formed in the height direction to extend from the boundary with the front end region in the track width direction.

In the above construction of the present invention, in each of the bias layers and the electrode layers, which are formed on both sides of the multilayer film exhibiting magnetoresistance, the width dimension of the portion exposed from the ABS can be decreased to a value smaller than conventional elements, thereby manufacturing a thin film magnetic head causing no smearing between the bias and electrode layers and shielding layers.

In the present invention, in the front end regions of each of the electrode layer pair and the bias layer pair, the width dimension of a portion exposed from the ABS is preferably not more than about ⅔ the width dimension of the lower shielding layer and/or the upper shielding layer.

In the present invention, in the front end region of each of the electrode layers and the bias layers, the width dimension of the portion exposed from the ABS is preferably not more than about 9/10 the maximum width dimension of the back end region.

Furthermore, in the front end regions of each of the electrode layer pair and the bias layer pair, the width dimension of the portion exposed the ABS is preferably about 80 $\mu$m or less.

In the present invention, in the front end regions of each of the electrode layer pair and the bias layer pair, the width dimension of the portion exposed from the ABS is appropriately set in relation to the width dimension of the shielding layers. Therefore, the occurrence of smearing can be properly prevented. Particularly, it was confirmed by the experiment described later that the above-mentioned numerical limits can decrease the rate of short circuits between the electrode layers and the shielding layers to 10% or less.

In the present invention, in the front end regions of each of the electrode layer pair and the bias layer pair, the width dimension of the portion exposed from the ABS is preferably not more than about ¼ the width dimension of the lower shielding layer and/or the upper shielding layer. In the front end region of each of the electrode layers and the bias layers, the width dimension of the portion exposed from the ABS is preferably not more than ⅓ the maximum width dimension of the back end region. Furthermore, in the front end regions of each of the electrode layer pair and the bias layer pair, the width dimension of the portion exposed from the ABS is preferably not more than 30 $\mu$m.

It was confirmed by the experiment described later that the above numerical limits can decrease the rate of short circuits between the electrode layers and the shielding layers to 5% or less.

In the present invention, the length dimension of the front end region in the height direction is preferably in the range of 0.5 $\mu$m to 2.0 $\mu$m.

In the present invention, assuming that a line extended from the outer edge of the front end region, or when the outer edge of the front end region has a curved line, a line tangent to the curved line at the center of the length thereof, is a first phantom line, and a line extended from the outer edge of the back end region, or when the outer edge of the back end region has a curved line, a line tangent to the curved line at the center of the length thereof, is a second phantom line, the inclination angle $\alpha$ of the first phantom line with respect to the height direction is preferably smaller than the inclination angle $\beta$ of the second phantom line.

In the present invention, the first phantom line may be extended in parallel with the height direction, or the outer edge of the front end region may be linearly extended in the height direction while being extended in the track width direction.

The present invention provides a substrate comprising a magnetoresistive element for a thin film magnetic head, comprising a multilayer film exhibiting magnetoresistance, a pair of bias layers formed on both sides of the multilayer film, for applying a bias magnetic field to the multilayer film, and a pair of electrode layers formed on the bias layers to conduct to the multilayer film, and a magnetoresistive element for a monitor used for controlling the height and having the same construction of the magnetoresistive element for a thin film magnetic head, both of which elements are formed on a lower shielding layer with a lower gap layer provided therebetween; and an upper shielding layer formed on the magnetoresistive elements with an upper gap layer provided therebetween; wherein at least one of the magnetoresistive element for a thin film magnetic head and the magnetoresistive element for a monitor has the above-described structure.

A thin film magnetic head comprising a magnetoresistive element comprising a spin-valve film (a GMR element) is formed from a wafer, on which a plurality of magnetoresistive elements are formed, through various processes.

The exposed surface of the magnetoresistive element formed in the thin film magnetic head is referred to as "ABS" so that the exposed ABS is opposed to a recording medium in reproduction of signals from the recording medium. The direction perpendicular to the ABS and apart from the recording medium opposed to the ABS is referred to as "the height direction". The length dimension of the magnetoresistive element in the height direction is a very important dimension for determining the DC resistance of the magnetoresistive element.

In order to set the length of the magnetoresistive element in the height direction to a predetermined value by grinding (height controlling) in relation to the DC resistance, a monitor element having the same construction as the magnetoresistive element is formed on the same line as the magnetoresistive element formed on the substrate so that the ABS-side surfaces of the magnetoresistive element and the monitor element are subjected to the height controlling process while measuring the DC resistance of the monitor element. When a predetermined resistance value is obtained, the height controlling process is finished. As a result, the magnetoresistive element has a length dimension in the height direction with which the predetermined resistance is obtained.

In the present invention, in order to comply with the demand for narrowing the gap with an increase in the recording density, each of the bias layers and the electrode layers which constitute the monitor element and/or the magnetoresistive element comprises a front end region and a back end region which is formed in the height direction to extend from the boundary with the front end region in the track width direction. Therefore, in the front end region, the width dimension of the portion exposed from the ABS can be decreased to a value smaller than conventional elements. In addition, on the back end side, the region where the bias layers and the electrode layers are formed can be maintained to the same level as conventional elements.

In the present invention, the width dimension of the front end region of each of the bias layers and the electrode layers can be set to a small value, thereby permitting the height controlling process while appropriately measuring the DC resistance of the monitor element with causing less smearing.

The substrate on which the thin film magnetic head is formed is finally cut for each magnetoresistive element to complete a thin film magnetic head. With the magnetoresistive element comprising the bias layers and the electrodes formed in the above-described form, smearing less occurs in a thin film magnetic head as a completed product, thereby manufacturing thin film magnetic heads with high yield.

DESCRIPTION OF THE PREFERRED EMBODIMENT

Figure 1:
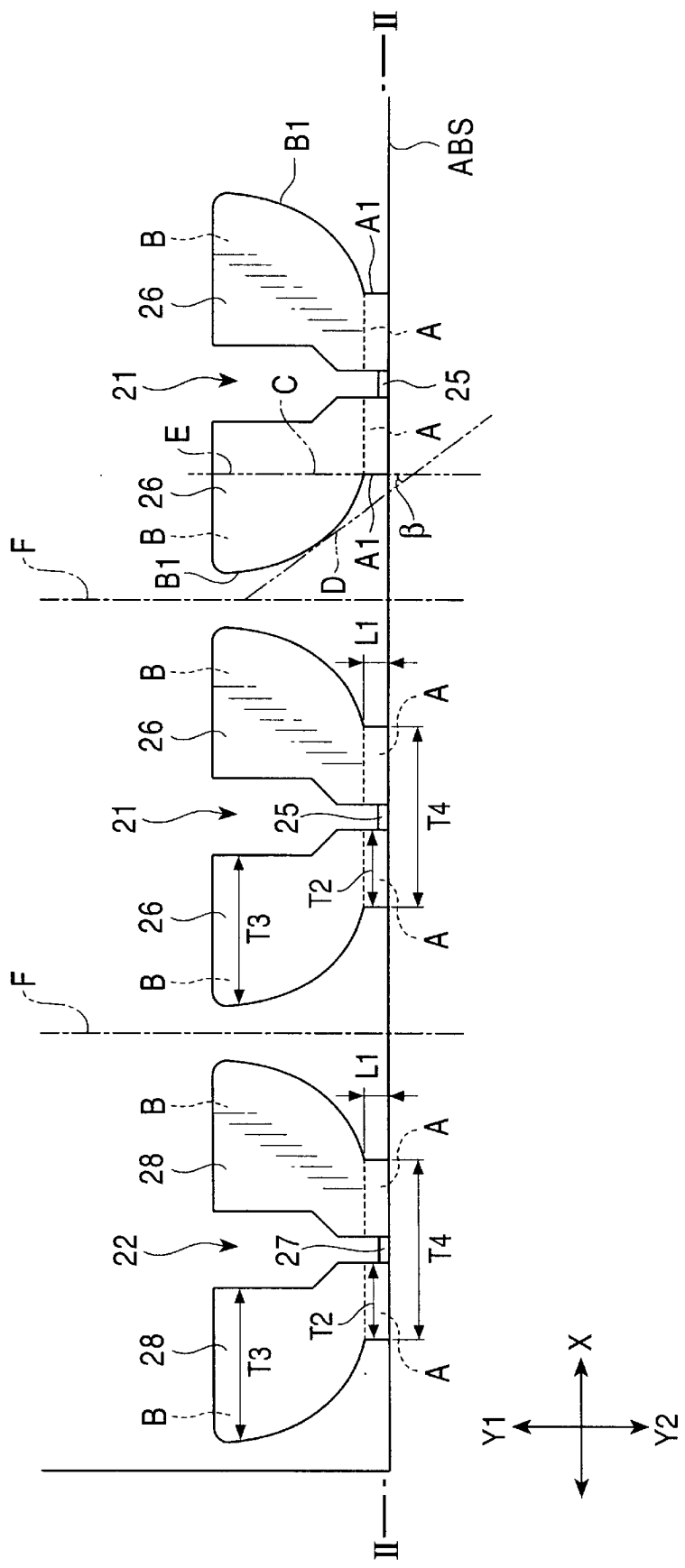
FIG. 1 is a partial plan view of a substrate on which thin film magnetic heads are formed in accordance with the present invention.
Figure 2:
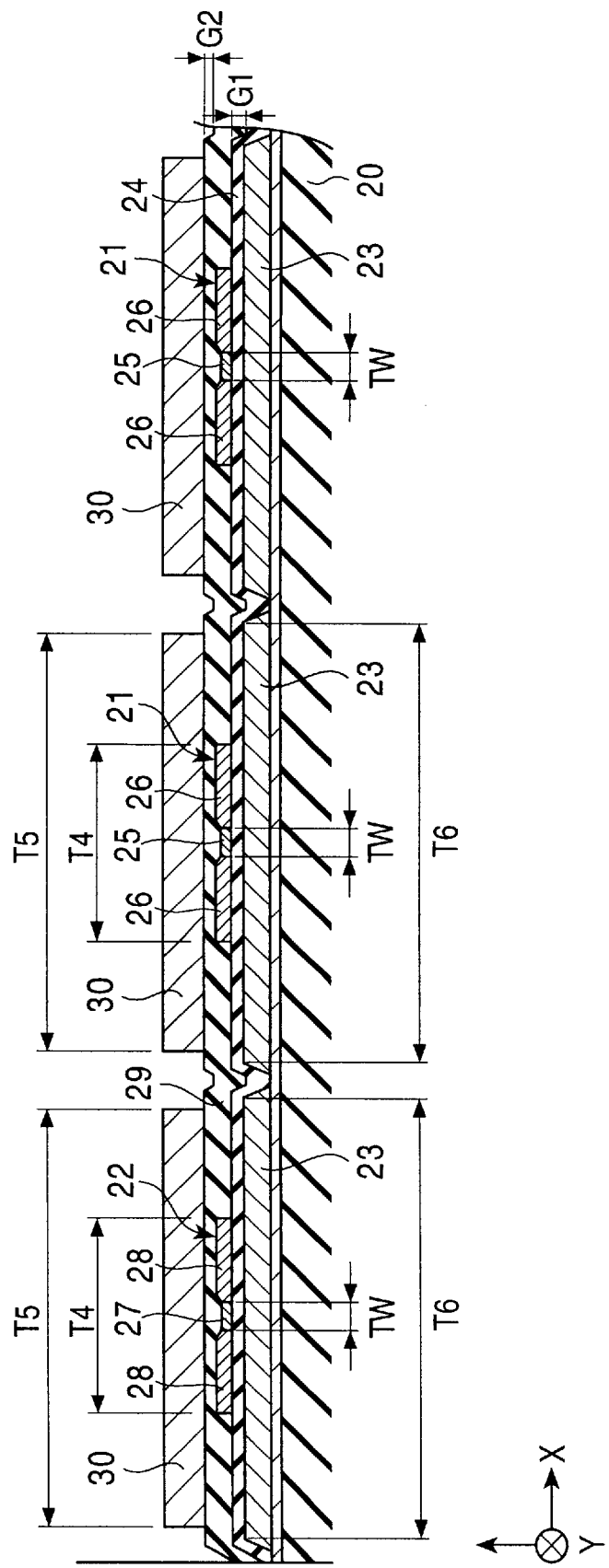
FIG. 2 is a sectional view taken along line II—II in FIG. 1.

FIG. 1 is a partial plan view showing the shape of a substrate on which thin film magnetic heads are formed in accordance with the present invention, and FIG. 2 is a partial sectional view taken along line II—II in FIG. 1. In FIG. 2, the upper gap layer and the upper shielding layer shown in FIG. 2 are omitted.

FIGS. 1 and 2 show the substrate in a state after the height controlling process.

For example, the substrate 20 shown in FIG. 2 is made of $Al_2O_3$—TiC (alumina-titanium carbide), and is processed to a square block.

As shown in FIG. 1, the front side of the substrate is referred to as "ABS", the front structures of a plurality of magnetoresistive elements 21 and a monitor element 22 are exposed form the ABS.

After the ABS of the substrate 20 is subjected to predetermined processings such as formation of rails (not shown), formation of a crown, etc., the substrate 20 is cut to complete a thin film magnetic head comprising each of the magnetoresistive elements 21.

As shown in FIG. 2, a lower shielding layer 23 made of, for example, a NiFe alloy (permalloy) is formed on the substrate 20. The lower shielding layer 23 is formed with a width dimension T6. A lower gap layer 24 made of an insulating material such as $SiO_2$, $Al_2O_3$ (alumina), $Ti_2O_3$, TiO, $WO_3$, AlN, AlSiN, or the like, and having a gap length G1 is formed on the lower shielding layer 23. A plurality of magnetoresistive elements 21 and a monitor element 22 are formed on the lower gap layer 24 to be arranged in a line in the X direction (the ABS direction).

As shown in FIG. 2, each of the magnetoresistive elements 21 comprises a multilayer film 25 comprising a GMR element such as a spin-valve film, which utilizes a giant magnetoresistive effect, or an AMR element which utilizes an anisotropic magnetoresistive effect, a pair of hard bias layers (not shown) formed on both sides of the multilayer film 25, and a pair of electrode layers 26 made of chromium (Cr) or the like and conducting to the multilayer film 25. The width dimension of the multilayer film 25 is defined as track width Tw.

The monitor element 22 has the same construction as the magnetoresistive elements 21. Namely, the monitor element 22 comprises a multilayer film 27 exhibiting the magnetoresistive effect, and hard bias layers and electrode layers 28, which are formed on both sides of the multilayer film 27.

As shown in FIG. 2, an upper gap layer 29 made of an insulating material such as $SiO_2$, $Al_2O_3$ (alumina), $Ti_2O_3$, TiO, $WO_3$, AlN, AlSiN, or the like, and having a gap length G2 is formed on the magnetoresistive elements 21 and the monitor element 22. An upper shielding layer 30 made of an NiFe alloy or the like is formed on the upper gap layer 29. The upper shielding layer 30 is formed with a width dimension T5.

The multilayer structure ranging from the lower shielding layer 23 to the upper shielding layer 30 corresponds to a reproducing head portion of a thin film magnetic head manufactured as a product. For example, with the magnetoresistive element 21 comprising the multilayer film 25 comprising a spin-valve film, a leakage of a magnetic field from a recording medium in the direction perpendicular to the drawing causes a change in magnetization of a free magnetic layer which constitutes the spin-valve film. As a result, DC resistance changes according to the relation between pinned magnetization of the fixed magnetic layer, which constitutes the spin-valve film, and variable magnetization of the free magnetic layer, to reproduce a recording magnetic field.

The thin film magnetic head manufactured as a product may be a so-called combination type thin film magnetic film comprising not only a reproducing head but also a writing inductive head. In this case, the writing inductive head comprising a coil and a core is formed on the upper shielding layer 30 shown in FIG. 2.

In the present invention, as shown in FIG. 1, each of the electrode layers 28 formed on both sides of the multilayer 27 of the monitor 22, and the electrode layers 26 formed on both sides of each of the magnetoresistive elements 21 comprises a front end region A formed with a predetermined length L1 from the ABS, and a back end region B formed from the front end region A in the height direction (the Y direction shown in the drawing) to extend in the track width direction (the X direction shown in the drawing).

In FIG. 1, the front end region A of each of the electrodes layers 26 and 28 formed on both sides of the multilayer films 25 and 27, respectively, is formed with a predetermined width dimension T2, and the back end region B is formed in a shape in which the width dimension gradually increases from the boundary with the front end region A in the height direction. The hard bias layers respectively formed on the electrode layers 26 and 28 are also formed in substantially the same shape as the electrode layers 26 and 28.

Figure 5:
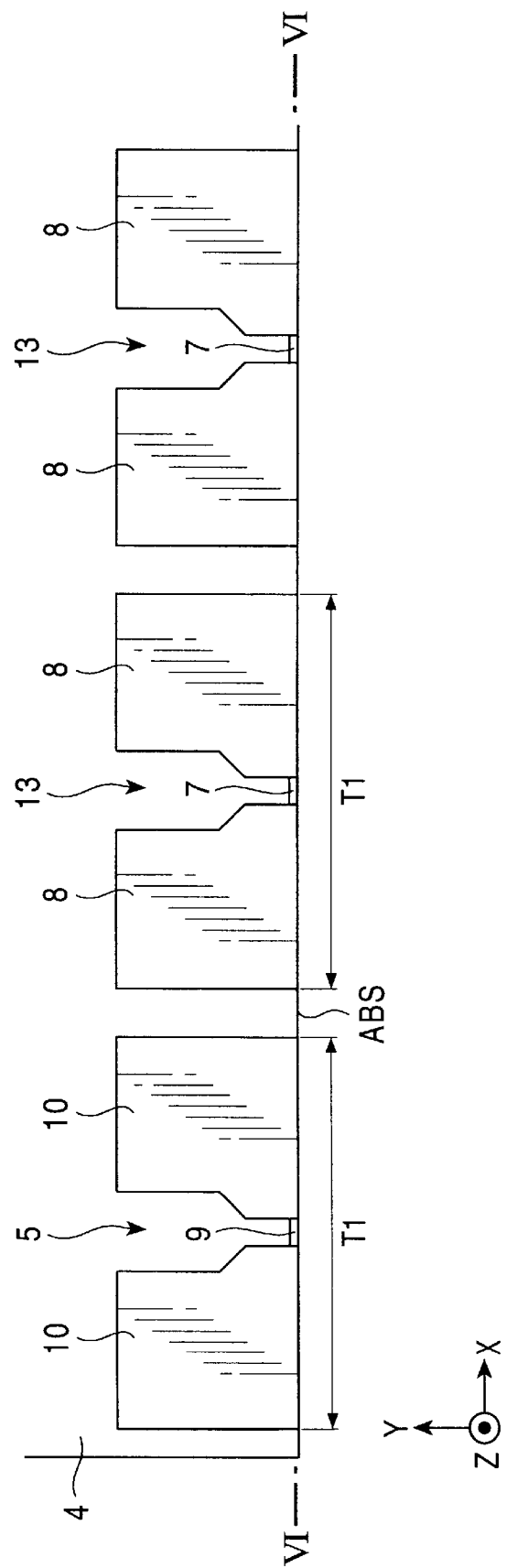
FIG. 5 is a partial plan view of a conventional substrate on which thin film magnetic heads are formed.
Figure 6:
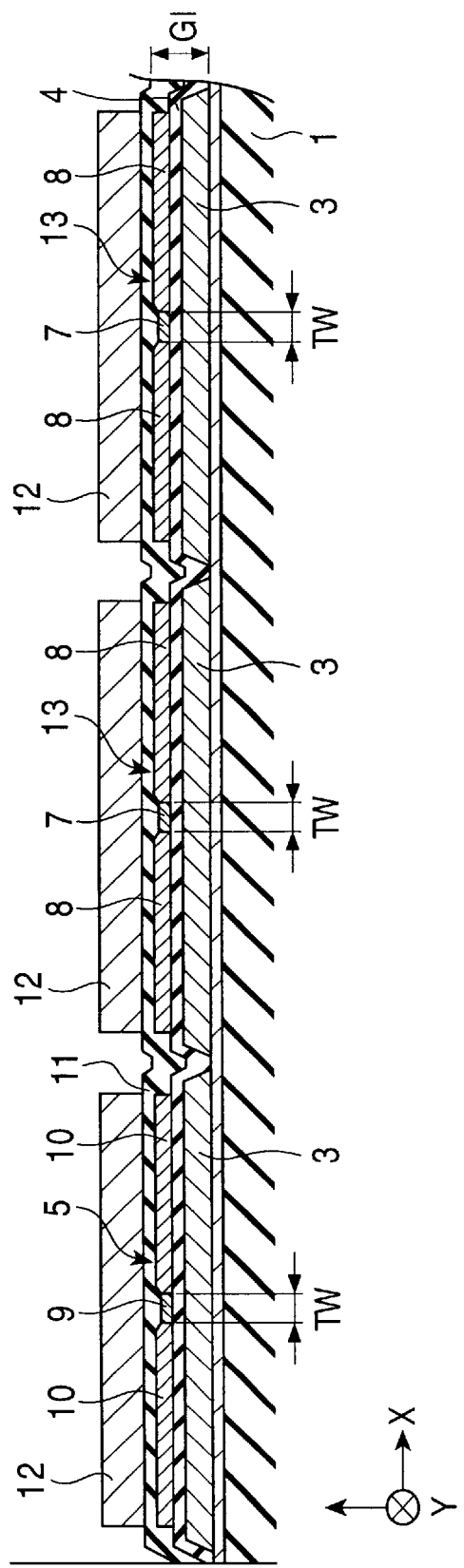
FIG. 6 is a sectional view taken along line VI—VI in FIG. 5.

In conventional electrode layers 8 and 10 (refer to FIG. 5), the front end region A and the back end region B of the present invention are not formed, and thus each of electrode layer pairs 8 and 10 exposed from the ABS have a large width dimension T1. However, in the present invention, the width dimension T2 of the front end region A of each of the electrode layers 26 and 28 exposed from the ABS is smaller than the width dimension of each of the conventional electrode layers 8 and 10 exposed from the ABS, and the back end region B is formed so that the width dimension increases from the boundary with the front end region A. As a result, the width dimension T4 of each of the hard bias layer pairs and the electrode layer pairs 26 and 28 exposed from the ABS can be decreased to a value smaller than the conventional element, and the back end region B can be maintained to substantially the same shape as. the conventional element.

By forming the electrode layer pairs 26 and 28 and the hard bias layer pairs, which are exposed from the ABS with the small width dimension T4, particularly, it is possible to appropriately prevent the occurrence of smearing between the electrode layers 26 or 28 and the shielding layers 23 and 30. By maintaining the back end region B to substantially the same shape as conventional elements, magnetic and electrical properties can be maintained to substantially the same level as conventional elements.

In the present invention, in each of the electrode layer pairs 26 and 28, and the hard bias layer pairs, the width dimension T4 of the portion exposed from the ABS is preferably not more than ⅔ the width dimension T6 of the lower shielding layer 23 and/or the width dimension T5 of the upper shielding layer 30.

In the present invention, in each of the electrode layers 26 or 28 and the hard bias layers, the width dimension T2 of the portion exposed from the ABS is preferably not more than 9/10 the maximum width dimension T3 of the back end region B.

In the present invention, in each of the electrode layer pairs 26 and 28, and the hard bias layer pairs, the width dimension T4 of the portion exposed from the ABS is preferably about 80 μm or less. In this case, the width dimension (i.e., the track width Tw) of each of the multilayer films 25 and 27 is about 1 μm, and thus the width dimension T2 of the portion of each of the hard bias layers and the electrode layers 26 or 28, which are exposed from the ABS, is about 39.5 μm.

In the present invention, it was confirmed by the experiment described later that the above-described numerical limits can decrease the rate of short circuits occurring between the electrode layers 26 or 28 and the shielding layers 23 and 30 to 10% or less. Assuming that a sample showing a resistance deviation of 1 Ω or more from a standard resistance value is considered to cause a short circuit, the rate of short circuits is determined by measuring the ratio of the number of such magnetoresistive element samples to 100 magnetoresistive element samples.

In the present invention, in each of the electrode layer pairs 26 and 28 and the hard bias layer pairs, the width dimension T4 of the portion exposed from the ABS is preferably not more than about ¼ the width dimension T6 of the lower shielding layer 23 and/or the width dimension T5 of the upper shielding layer 30.

In the present invention, in each of the electrode layers 26 or 28 and the hard bias layers, the width dimension T2 of the portion exposed from the ABS is preferably not more than about ⅓ the maximum width dimension T3 of the back end region B.

In the present invention, in each of the electrode layer pairs 26 and 28, and the hard bias layer pairs, the width dimension T4 of the portion exposed from the ABS is preferably about 30 μm or less. In this case, the width dimension (i.e., the track width Tw) of each of the multilayer films 25 and 27 is about 1 μm, and thus the width dimension T2 of the portion of each of the hard bias layers and the electrode layers 26 or 28, which are exposed from the ABS, is about 14.5 μm.

In the present invention, it was confirmed by the experiment described later that the above-described numerical limits can decrease the rate of short circuits occurring between the electrode layers 26 or 28 and the shielding layers 23 and 30 to 5% or less.

In limiting the above numerical values, it is necessary to consider the relation between the upper shielding layer 30 and the width dimension T3 of the back end region of each of the electrode layers 26 and 28.

The upper shielding layer 30 has the function as a covering layer for protecting the electrode layers 26 and 28 formed below the upper shielding layer 30, and main electrode layers formed to extend in the height direction and to be electrically connected to the electrode layers 26 and 28 from sputtering or the like in formation of layers above the upper shielding layer 30. Therefore, the upper shielding layer 30 must be formed in a shape larger than the electrode layers 26 and 28 and the main electrode layers.

As described above, in the present invention, in each of the electrode layer pairs 26 and 28 and the hard bias layer pairs, the width dimension T4 of the portion exposed from the ABS can be decreased, and the possibility of causing short circuit between the electrode layers 26 or 28 and the shielding layers 23 and 30 in the height controlling process can be more decreased as the width dimension T4 is decreased. However, in the portion of each of the electrode layer pairs 26 and 28, which is exposed from the ABS, with an excessively small width dimension T4, the DC resistance value is significantly increased in the height controlling process, and thus a change in the DC resistance is decreased, thereby deteriorating the measurement sensitivity of the monitor element 22. Therefore, in the present invention, in each of the electrode layer pairs 26 and 28, the width dimension T4 of the portion exposed from the ABS is preferably set to 10 μm or more.

In the present invention, the length dimension L1 of the front end region A in the height direction (the Y direction shown in the drawings) is preferably in the range of 0.5 to 2.0 μm.

With an excessively long length dimension L1, the front end region A having a small width dimension is formed with a long length in the height direction, and the back end region B having a large area is formed apart from each of the multilayer films 25 and 27, thereby causing the probability of deteriorating electric and magnetic properties as compared with conventional elements.

The problem of smearing concerns only the width dimension of the portion of each of the bias layers and the electrode layers 26 or 28, which are exposed from the ABS, and the portions of the hard bias layers and the electrode layers, which are formed inward of the ABS in the height direction, have no influence on smearing. Therefore, like in conventional elements, the portions of the hard bias layers and the electrode layers, which are formed inside the ABS in the height direction, are preferably formed in a large area, and the length dimension L1 of the front end region A in the height direction is preferably not so long.

As described above, FIGS. 1 and 2 show the substrate 20 in a state after the height controlling process. Therefore, before the height controlling process, the front end region A and the multilayer films 25 and 27 are formed to extend in the ABS direction (the Y2 direction shown in the drawings).

As shown in FIG. 1, in the present invention, assuming that a line extended from the outer edge A1 of the front end region A is a first phantom line C, and when the outer edge B1 of the back end region B has a curved surface, a line tangent to the curved surface at the center of the length thereof is a second phantom line D, the inclination angle $\alpha$ of the first phantom line C with a normal E in the height direction is preferably smaller than the inclination angle $\beta$ of the second phantom line D.

As shown in FIG. 1, the outer edge A1 of the front end region A is extended in the same direction as the normal E in the height direction, and thus the inclination angle $\alpha$ (not shown) of the first phantom line C extended from the outer edge A1 with the normal line E is 0°.

On the other hand, the outer edge B1 of the back end region B is formed in a curved shape, and the line (the second phantom line D) tangent to the curved surface at the center of the length thereof is inclined at an angle $\beta$ with the normal line E in the height direction, and the inclination angle $\beta$ is larger than the inclination angle $\alpha$ (=0°).

In this way, the inclination angle of the outer edge Al of the front end region A with the height direction is set to be smaller than the inclination angle of the outer edge B1 of the back end region B to decrease the width dimension of the front end region. Therefore, it is possible to prevent the width dimension of the front end region A exposed from the ABS from being rapidly increased by grinding the ABS in the height controlling process, thereby appropriately decreasing the occurrence of smearing.

In the present invention, the outer edge A1 of the front end region, and the outer edge B1 of the back end region B may be formed in any desired shape as long as the inclination angle $\alpha$ is smaller than the inclination angle $\beta$. For example, as shown in FIG. 3, the outer edge A1 of the front end region A may comprise an inclined surface so that the width of the front end region A in the track width direction (the X direction) increases in the height direction (the Y1 direction).

Figure 3:
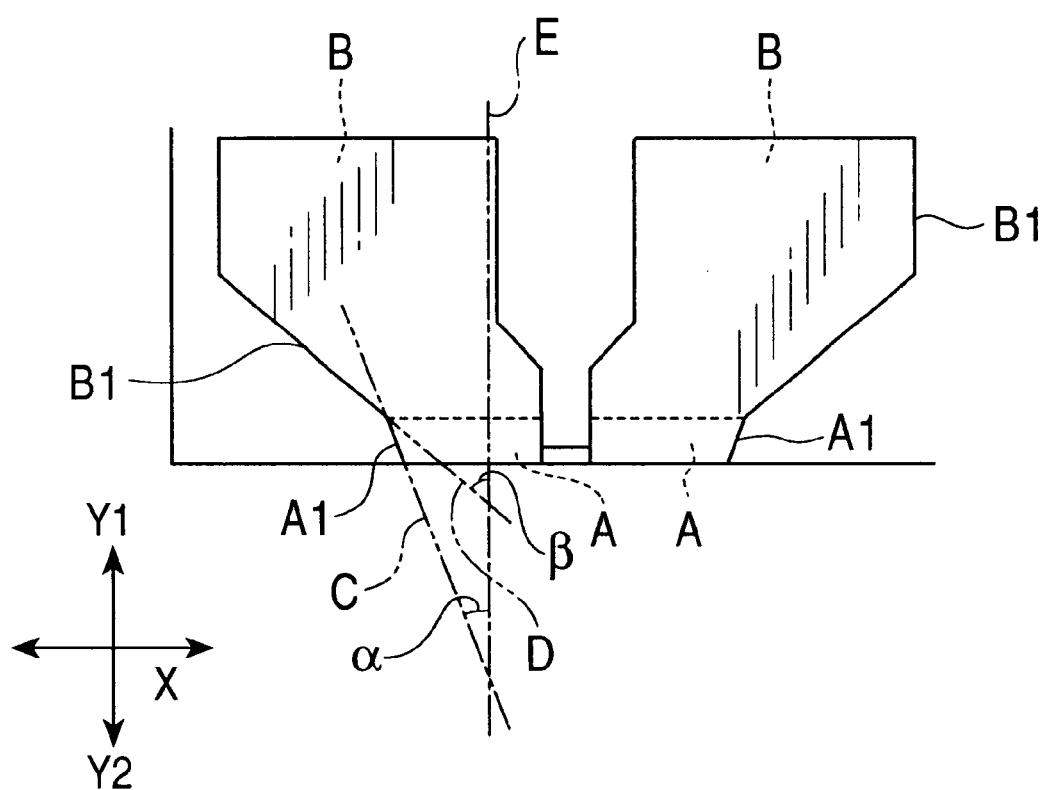
FIG. 3 is a partial plan view of a substrate on which thin film magnetic heads are formed in accordance with another embodiment of the present invention.

As shown in FIG. 3, the outer edge B1 of the back end region B may comprise an inclined surface so that the width in the track width direction increases in the height direction.

As shown in FIG. 3, assuming that a line extended from the outer edge A1 of the front end region A is a first phantom line C, and a line extended from the outer edge B1 of the back end region B is a second phantom line D, the inclination angle $\alpha$ of the first phantom line C with a normal line E in the height direction is smaller than the inclination angle $\beta$ of the second phantom line D.

In the present invention, the outer edge A1 of the front end region A may be formed in a curved surface. In this case, assuming that a line tangent to the curved surface at the center in the length direction is a first phantom line C, the inclination angle $\alpha$ of the first phantom line C with a normal line E in the height direction is smaller than the inclination angle $\beta$ of the second phantom line D extended from the outer edge B1 of the back end region B with the normal line E in the height direction.

The substrate which constitutes the thin film magnetic head described above with reference to FIGS. 1 to 3 is subjected to the height controlling process to set the DC resistance value of each of the magnetoresistive elements 21 to the predetermined value.

The height controlling process is performed by grinding the ABS (the height controlling process) while measuring the DC resistance value between the electrode layers 28 of the monitor element 22.

In the grinding process, the length dimension of each of the magnetoresistive elements 21 and the monitor element 22 in the height direction is decreased to gradually increase the DC resistance value between the electrode layers 28 of the monitor element 22.

When the DC resistance value of the monitor element 22 reaches the predetermined value by grinding the ABS to the predetermined dimension, the grinding process is finished to form each of the magnetoresistive elements 21 having a length dimension in the height direction with which the predetermined DC resistance is obtained.

After the height controlling process, the substrate on which the thin film magnetic heads are formed is cut along cutting lines F between the respective magnetoresistive elements 21, as shown in FIG. 1. After cutting, the monitor element 22 may be removed without manufactured as a product or manufactured as a product. The substrate having each of the cut magnetoresistive elements 21 is manufactured as a thin film magnetic head.

As described above, in the present invention, each of the hard bias layers and the electrode layers 28 comprises the front end region A and the back end region B extended from the front end region A in the track width direction, and the width dimension of the portion of the front end region A exposed from the ABS is smaller than conventional elements. Therefore, in controlling the height while measuring the DC resistance value of the monitor element 22, it is possible to prevent the occurrence of smearing (sagging) between the electrode layers 28 and the shielding layers 23 and 30 of the monitor element 22, thereby permitting the height controlling process while appropriately measuring the DC resistance value of the monitor element 22.

Furthermore, each of the hard bias layers and the electrode layers 26 which constitutes each of the magnetoresistive elements 21 comprises the front end region A and the back end region B extended from the front end region A in the track width direction, and the width dimension of the portion of the front end region A exposed from the ABS is smaller than conventional elements. Therefore, it is possible to appropriately prevent the occurrence of smearing in each of thin film magnetic heads manufactured as products, thereby permitting manufacture of thin film magnetic heads with high yield.

Although the present invention is preferably applied to all the monitor element 22 and the magnetoresistive elements 21 formed on the substrate, the present invention may be applied to only the monitor element side or the magnetoresistive element side.

In the present invention, experiment was performed on the relations between the rate of short circuits and the width dimension T4 ($\mu$m) of a pair of the electrode layers 28 exposed from the ABS in the monitor element 22, the ratio (%) of the width dimension T4 to the width dimension T5 of the upper shielding layer 30, and the ratio (%) of the width dimension T2 of each of the electrode layers 28 exposed from the ABS to the maximum width dimension T3 of the back end region B of each of the electrode layers 28.

Description will be made of the dimensions of each of layers formed on the substrate 20 having the monitor element 22 used in experiment.

A lower shielding layer 23 having a width dimension of 120 μm in the ABS direction is formed on the substrate 20, and a lower gap layer 24 having a gap length G1 of 0.18 μm is formed on the lower shielding layer 23.

The monitor element 22 shown in FIG. 1 is formed on the lower gap layer 24 by patterning. The multilayer film 27 constituting the monitor element 22 has a track width Tw of 1.0 μm, and a length dimension of 0.8±0.1 μm in the height direction.

Furthermore, an upper gap layer 29 having a gap length G2 of 0.18 μm is formed on the monitor element 22, and an upper shielding layer 30 having a width dimension of 110 μm in the ABS direction is formed on the upper gap layer 29.

100 substrates 20 having the layers respectively having the above-described dimension values are formed for each width dimension of the electrode layers 28 of the monitor element 22.

In experiment, the ABS is ground by using a processing device having an average grain size of ⅛ μm while measuring the DC resistance between the electrodes 28 of the monitor element 22.

Figure 4:
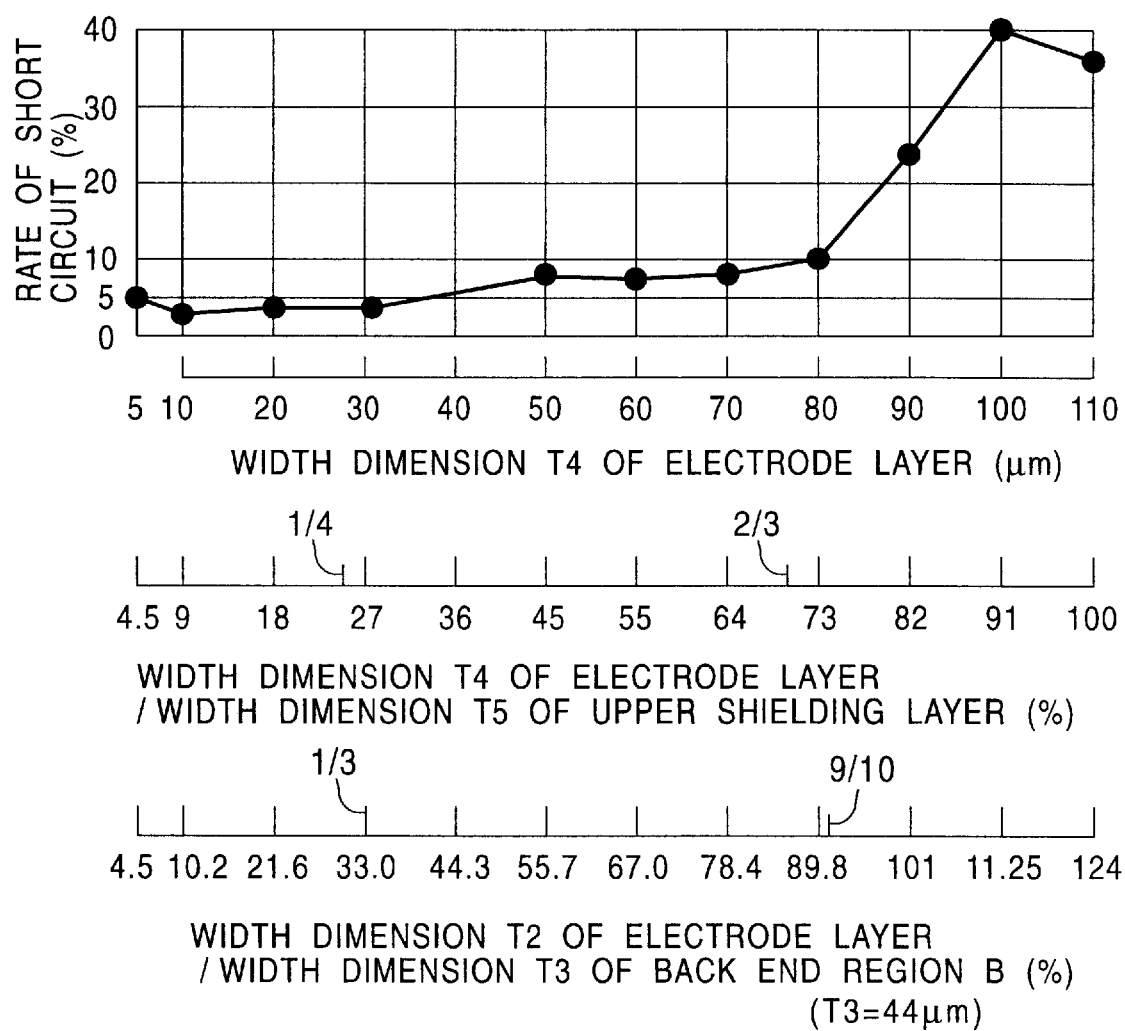
FIG. 4 is a graph showing the relation between the width dimension of electrode layers of a monitor element and the rate of short circuits.

FIG. 4 is a graph showing the relations between the rate of short circuits and the width dimension T4 of a pair of electrode layers 28, the ratio of the width dimension T4/width dimension T5 of the upper shielding layer 30, and the ratio of the width dimension T2 of each of the electrode layers 28/the width dimension T3 of the back end region B. Assuming that a sample showing a resistance deviation of 1 Ω or more from the standard DC resistance value is considered to cause a short circuit, the rate of short circuits is determined by measuring the ratio of the number of such samples to 100 samples comprising the electrode layers 28 having the same width dimension T4.

FIG. 4 indicates that as the width dimension T4 of the electrode layers 28 increases, the rate of short circuits increases. Particularly, with the electrode layers 28 having a width dimension T4 of 80 μm or more, the rate of short circuits is 10% or more.

It is also found that since the width dimension T5 of the upper shielding layer 30 is 110 μm, as described above, the rate of short circuits exceeds 10% with the ratio of width dimension T4/width dimension T5 of about 73% or more.

In the above experiment, the width dimension (=track width Tw) of the multilayer film 27 (refer to FIG. 2) is about 1 μm, and thus where the width dimension T4 of a pair of the electrode layers 28 exposed from the ABS is 80 μm or more, the width dimension T2 (refer to FIG. 1) of each of the electrode layers 28 exposed from the ABS is about 39.6 μm. In the above experiment, the maximum width dimension T5 of the back end region B of each of the electrode layers 28 is about 44 μm, and thus the rate of short circuits is 10% or more when the ratio of width dimension T2/width dimension T3 is about 89.8% or more.

In the present invention, the rate of short circuits is preferably as low as possible, and particularly in the range of 10% or less.

Therefore, the width dimension T4, the ratio of width dimension T4/width dimension T5 and the ratio of width dimension T2/width dimension T3, with which the rate of short circuits is 10% or less, are determined by FIG. 4. It is found that in order to decrease the rate of short circuits to 10% or less, the width dimension is about 80 μm or less, the ratio of dimension T4/width dimension T5 is about ⅔ or less, and the ratio of width dimension T2/width dimension T3 is about 9/10 or less.

In the present invention, the rate of short circuits is more preferably in the range of 5% or less.

Therefore, the width dimension T4, the ratio of width dimension T4/width dimension T5 and the ratio of width dimension T2/width dimension T3, with which the rate of short circuits is 5% or less, are determined by FIG. 4. It is found that in order to decrease the rate of short circuits to 5% or less, the width dimension is about 30 m or less, the ratio of dimension T4/width dimension T5 is about ¼ or less, and the ratio of width dimension T2/width dimension T3 is about ⅓ or less.

Although the above experiment is performed for the width dimension of the electrode layers, the above-described numerical limits can be applied to the width dimension of the hard bias layers formed below the electrode layers and having substantially the same shape as the electrode layers.

Although, in the above experiment, the ratio of the width dimension T4 of the electrode layers 28 to the width dimension T5 of the upper shielding layer 30 is determined, the ratio of the width dimension T4 of the electrode layers 28 to the width dimension T6 of the lower shielding layer 23 is also preferably the same value as the ratio of width dimension T4/width dimension T5.

As described above, in the present invention, each of the bias layers and the electrode layers which constitute a monitor element and/or a magnetoresistive element comprises a front end region A exposed from the ABS, and a back end region B formed from the boundary with the front end region A in the height direction to extend in the track width direction. Therefore, the width dimension of each of the bias layers and the electrode layers exposed from the ABS can be set to be smaller than conventional values, and the region on the back end side of each of the bias layers and the electrode layers can be maintained to the same level as conventional elements.

Like in the present invention, the width dimension of each of the bias layers and the electrode layers exposed from the ABS is set to a small value to decrease the occurrence of smearing between the electrode layers and shielding layers in a monitor element in the process for controlling the height while measuring the DC resistance value of the monitor element, thereby permitting appropriate measurement of the DC resistance.

Since the occurrence of smearing between the electrode layers and shielding layers of a magnetoresistive element can be decreased, the yield of thin film magnetic heads manufactured as products can be improved.

What is claimed is:

1. A thin film magnetic head comprising a lower shielding layer, a magnetoresistive element formed on the lower shielding layer with a lower gap layer provided therebetween and comprising a multilayer film exhibiting magnetoresistance, a pair of bias layers formed on both sides of the multilayer film, for applying a bias magnetic field to the multilayer film, and a pair of electrode layers formed on the bias layers to conduct to the multilayer film, and an upper shielding layer formed on the magnetoresistive element with an upper gap layer provided therebetween;

wherein each of the electrode layers and the bias layers comprises a front end region formed with a predetermined length dimension from ABS in the height direction, and a back end region formed in the height direction to extend from the boundary with the front end region in the track width direction, and wherein, assuming that a line extended from the outer edge of the front end region, or when the outer edge of the front end region has a curved line, a line tangent to the curved line at the center of the length thereof, is a first phantom line, and a line extended from the outer edge of the back end region, or when the outer edge of the back end region has a curved line, a line tangent to the curved line at the center of the length thereof, is a second phantom line, the inclination angle α of the first phantom line with the height direction is smaller than the inclination angle β of the second phantom line.

2. A thin film magnetic head according to claim 1, wherein in the portion of the front end regions of each of the electrode layer pair and the bias layer pair, the width dimension of a portion exposed from the ABS is not more than about ⅔ the width dimension of the lower shielding layer and/or the upper shielding layer.

3. A thin film magnetic head according to claim 1, wherein in the front end regions of each of the electrode layer pair and the bias layer pair, the width dimension of the portion exposed from the ABS is not more than about 9/10 the maximum width dimension of the back end region.

4. A thin film magnetic head according to claim 1, wherein in the front end regions of each of the electrode layer pair and the bias layer pair, the width dimension of the portion exposed from the ABS is about 80 μm or less.

5. A thin film magnetic head according to claim 1, wherein in the front end regions of each of the electrode layer pair and the bias layer pair, the width dimension of the portion exposed from the ABS is not more than about ¼ the width dimension of the lower shielding layer and/or the upper shielding layer.

6. A thin film magnetic head according to claim 1, wherein in the front end regions of each of the electrode layer pair and the bias layer pair, the width dimension of the portion exposed from the ABS is not more than ⅓ the maximum width dimension of the back end region.

7. A thin film magnetic head according to claim 1, wherein in the front end regions of each of the electrode layer pair and the bias layer pair, the width dimension of the portion exposed from the ABS is not more than about 30 μm.

8. A thin film magnetic head according to claim 1, wherein the length dimension of the front end region in the height direction is in the range of 0.5 μm to 2.0 μm.

9. A thin film magnetic head according to claim 1, wherein the first phantom line is extended in parallel with the height direction.

10. A thin film magnetic head according to claim 1, wherein the outer edge of the front end region is linearly extended in the height direction while being extended in the track width direction.

11. A substrate for forming a thin film magnetic head comprising a magnetoresistive element for a thin film magnetic head comprising a multilayer film exhibiting magnetoresistance, a pair of bias layers formed on both sides of the multilayer film, for applying a bias magnetic field to the multilayer film, and a pair of electrode layers formed on the bias layers to conduct to the multilayer film, and a magnetoresistive element for a monitor used for determining the height and having the same construction of the magnetoresistive element for a thin film magnetic head, both of which elements are formed on a lower shielding layer with a lower gap layer provided therebetween; and an upper shielding layer formed on the magnetoresistive elements with an upper gap layer provided therebetween;

wherein at least one of the magnetoresistive element for a thin film magnetic head and the magnetoresistive element for a monitor has a structure wherein each of the electrode layers and the bias layers comprises a front end region formed with a predetermined length dimension from ABS in the height direction, and a back end region formed in the height direction to extend from the boundary with the front end region in the track width direction, and wherein, assuming that a line extended from the outer edge of the front end region, or when the outer edge of the front end region has a curved line, a line tangent to the curved line at the center of the length thereof, is a first phantom line, and a line extended from the outer edge of the back end region, or when the outer edge of the back end region has a curved line, a line tangent to the curved line at the center of the length thereof, is a second phantom line, the inclination angle α of the first phantom line with the height direction is smaller than the inclination angle β of the second phantom line.

* * * * *